United States Patent
Alvarez et al.

(10) Patent No.: US 10,043,402 B1
(45) Date of Patent: Aug. 7, 2018

(54) FLIGHT PATH CROSS CHECK

(71) Applicants: Jorge A. Alvarez, Cedar Rapids, IA (US); David L. Leedom, Center Point, IA (US); Brian E. Mishmash, Atkins, IA (US)

(72) Inventors: Jorge A. Alvarez, Cedar Rapids, IA (US); David L. Leedom, Center Point, IA (US); Brian E. Mishmash, Atkins, IA (US)

(73) Assignee: ROCKWELL COLLINS, INC., Cedar Rapids, IA (US)

(*) Notice: Subject to any disclaimer, the term of this patent is extended or adjusted under 35 U.S.C. 154(b) by 0 days.

(21) Appl. No.: 14/846,221

(22) Filed: Sep. 4, 2015

(51) Int. Cl.
G08G 5/00 (2006.01)
B64D 15/20 (2006.01)

(52) U.S. Cl.
CPC ........... G08G 5/0091 (2013.01); B64D 15/20 (2013.01)

(58) Field of Classification Search
CPC ......... B64C 19/00; B64C 27/54; G01C 23/00; G01C 23/005; G05D 1/077; G05D 1/0676; G05D 1/0858; G01P 13/025; G05B 19/0428; G05B 2219/24192; G05B 2219/25069; G05B 23/0289; G05G 5/0013; G05G 5/0021; G05G 5/0052; G05G 5/025; G05G 5/0082; G05G 5/0091; Y02E 10/723; B64D 2045/0085; B64D 43/00; G01M 1/125; G01M 9/06; G01M 9/08; G01S 19/15

USPC ......... 701/3, 14, 18, 31.4, 120, 414; 702/50, 702/175; 714/47.2; 382/103; 340/945, 340/975; 290/44; 244/17.13
See application file for complete search history.

(56) References Cited

U.S. PATENT DOCUMENTS

| | | | | |
|---|---|---|---|---|
| 4,706,198 A | * | 11/1987 | Thurman | G08G 5/0013 701/120 |
| 4,866,450 A | * | 9/1989 | Chisholm | G01S 1/10 342/33 |
| 2006/0273928 A1 | * | 12/2006 | Van Boven | G05D 1/0676 340/945 |
| 2008/0065352 A1 | * | 3/2008 | Coulmeau | G01G 19/414 702/175 |
| 2008/0294311 A1 | * | 11/2008 | Henson | F02D 41/221 701/31.4 |

(Continued)

*Primary Examiner* — Anne M Antonucci
*Assistant Examiner* — Sanjeev Malhotra
(74) *Attorney, Agent, or Firm* — Donna P. Suchy; Daniel M. Barbieri (57) ABSTRACT

A system includes a communications system and at least one processor coupled with the communications system and with a non-transitory processor-readable medium storing processor-executable code. The communications system is configured to receive measured air data from an air sensor system and receive flight data from a flight monitoring system. The air data is indicative of at least one air characteristic of an environment surrounding an aircraft. The flight data is indicative of at least one flight characteristic of the aircraft. The processor-executable code causes the at least one processor to detect a failed state of the air sensor system based on the measure air data and the flight data, estimate air data in response to detecting the failed state of the air sensor system, and provide the estimated air data to at least one of a display device and an automated flight control system.

19 Claims, 6 Drawing Sheets

(56) References Cited

U.S. PATENT DOCUMENTS

| | | | |
|---|---|---|---|
| 2009/0112464 A1* | 4/2009 | Belcher | G01C 21/165 |
| | | | 701/414 |
| 2010/0100260 A1* | 4/2010 | McIntyre | B64C 13/503 |
| | | | 701/6 |
| 2011/0118911 A1* | 5/2011 | Ishihara | G08G 5/025 |
| | | | 701/18 |
| 2011/0180656 A1* | 7/2011 | Shue | G05D 1/0077 |
| | | | 244/17.13 |
| 2011/0184592 A1* | 7/2011 | Elias | G01C 23/00 |
| | | | 701/7 |
| 2012/0123704 A1* | 5/2012 | Golly | G01P 5/165 |
| | | | 702/50 |
| 2012/0296500 A1* | 11/2012 | Yamasaki | G01M 9/06 |
| | | | 701/14 |
| 2012/0299753 A1* | 11/2012 | Thoreen | G01C 23/005 |
| | | | 340/975 |
| 2013/0015662 A1* | 1/2013 | Bertolotti | F03D 7/028 |
| | | | 290/44 |
| 2013/0338859 A1* | 12/2013 | Yamasaki | G05D 1/0055 |
| | | | 701/3 |
| 2014/0005862 A1* | 1/2014 | Shue | G05D 1/0077 |
| | | | 701/3 |
| 2014/0074325 A1* | 3/2014 | Nikolic | G01C 23/005 |
| | | | 701/14 |
| 2014/0215278 A1* | 7/2014 | Nelson | G06F 11/1482 |
| | | | 714/47.2 |
| 2014/0330455 A1* | 11/2014 | McIntyre | B64C 13/503 |
| | | | 701/3 |
| 2015/0100184 A1* | 4/2015 | Nathan | G01C 23/00 |
| | | | 701/7 |
| 2015/0177737 A1* | 6/2015 | Jensen | B64C 31/06 |
| | | | 701/3 |
| 2016/0035080 A1* | 2/2016 | O'Dell | H04N 5/23232 |
| | | | 382/103 |

* cited by examiner

//<br>
FLIGHT PATH CROSS CHECK

BACKGROUND

The inventive concepts disclosed herein relate generally to the field of aircraft sensor systems, and more particularly to aircraft sensor systems for acquiring and validating air data during a flight.

Aircrafts typically include air data sensors that acquire various data regarding the operation of an aircraft and a surrounding environment. However, air data sensors may operate in conditions that lead to incorrect data readings without any alerts being provided to the crew or the control systems of the aircraft. For example, cold weather or flying at high altitudes may cause ice to build up on, around, or within air data sensors, which may cause the air data sensors to provide onboard flight systems with erroneous or confusing data that may mislead pilots or affect the operation of automated systems of the plane. Ice build up on sensors has caused a number of recent aviation disasters, such as the crash of Air France AF-447. During the flight of Air France AF-447, ice crystals blocked the plane's pitot tubes, which are used by aircraft to determine air speed. As a result of the ice buildup, the aircraft's autopilot system disconnected and flight instruments displayed an erroneous airspeed, which ultimately led to the aircraft crashing.

A need exists for systems and methods for detecting aircraft sensor failures due to external conditions (e.g., hardware is functioning but covered in ice) and to warn aircraft crew of such failures. A further need exists for estimating air data in response to such aircraft sensor failures such that accurate air data is still be provided to aircraft crew.

SUMMARY

In one aspect, embodiments of the inventive concepts disclosed herein are directed to a system for cross checking aircraft operating data. The system includes a communications system and at least one processor coupled with a non-transitory processor-readable medium storing processor-executable code. The communications system is configured to receive measured air data indicative of at least one air characteristic of an environment surrounding an aircraft from an air sensor system. The communications system is further configured to receive flight data indicative of at least one flight characteristic of the aircraft from a flight monitoring system. The at least one processor is coupled with the communications system. The processor-executable code causes the at least one processor to detect a failed state of the air sensor system based on the measured air data and the flight data, estimate air data in response to detecting the failed state of the air sensor system, and provide the estimated air data to at least one of a display device and an automated flight control system.

In a further aspect, embodiments of the inventive concepts disclosed herein are directed to a method for cross checking aircraft operating data. The method includes receiving measured air data from an air sensor system indicative of at least one air characteristic of the environment surrounding an aircraft; receiving flight data from a flight monitoring system indicative of at least one flight characteristic of the aircraft; detecting a failed state of the air sensor system based on the measured air data and the flight data; estimating air data indicative of at least one of an estimated indicated airspeed and an estimated altitude of the aircraft; and providing the estimated air data to at least one of a display device and an automated flight control system of the aircraft to replace the measured air data.

In another aspect, embodiments of the inventive concepts disclosed herein are directed to a system for cross checking aircraft operating data. The system includes at least one processor coupled with a non-transitory processor-readable medium storing processor-executable code. The processor-executable code causes the at least one processor to detect a failed state of an air sensor system. Detecting the failed state indicates that the air sensor system is inaccurately measuring air data. The processor-executable code further causes at least one processor to estimate the air data in response to detecting the failed state of the air sensor system and validate the estimated air data based on a comparison of an energy of the aircraft. The comparison of the energy of the aircraft is based on the estimated air data and flight data received from a flight monitoring system. The processor-executable code further causes the at least one processor to provide the estimated air data to at least one of a display device and an automated flight control system in response to the estimated air data being validated.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Before turning to the figures, which illustrate exemplary embodiments of the inventive concepts disclosed herein in detail, it should be understood that the inventive concepts are not limited to the details or methodology set forth in the description or illustrated in the figures. It should also be understood that the terminology is for the purpose of description only and should not be regarded as limiting. Embodiments of the inventive concepts disclosed herein are configured to cross check measured aircraft operating data, detect a failure in a sensor system based on the cross check, estimate operating data to replace the measure operating data, and validate the estimated operating data to facilitate providing a flight crew of an aircraft with accurate information that enables them to continue flying the aircraft when sensors experience a failed state. The inventive concepts disclosed herein may be utilized in a number of display devices for various types of applications or sensing systems. In some embodiments, the inventive concepts disclosed herein may be used for a flight display of an aircraft. According to various exemplary embodiments, the inventive concepts disclosed herein may be used by any system in any embodiment for rendering computer graphics and displaying an output (e.g., in another aircraft, spacecraft, a ground-based vehicle).

Figure 1:
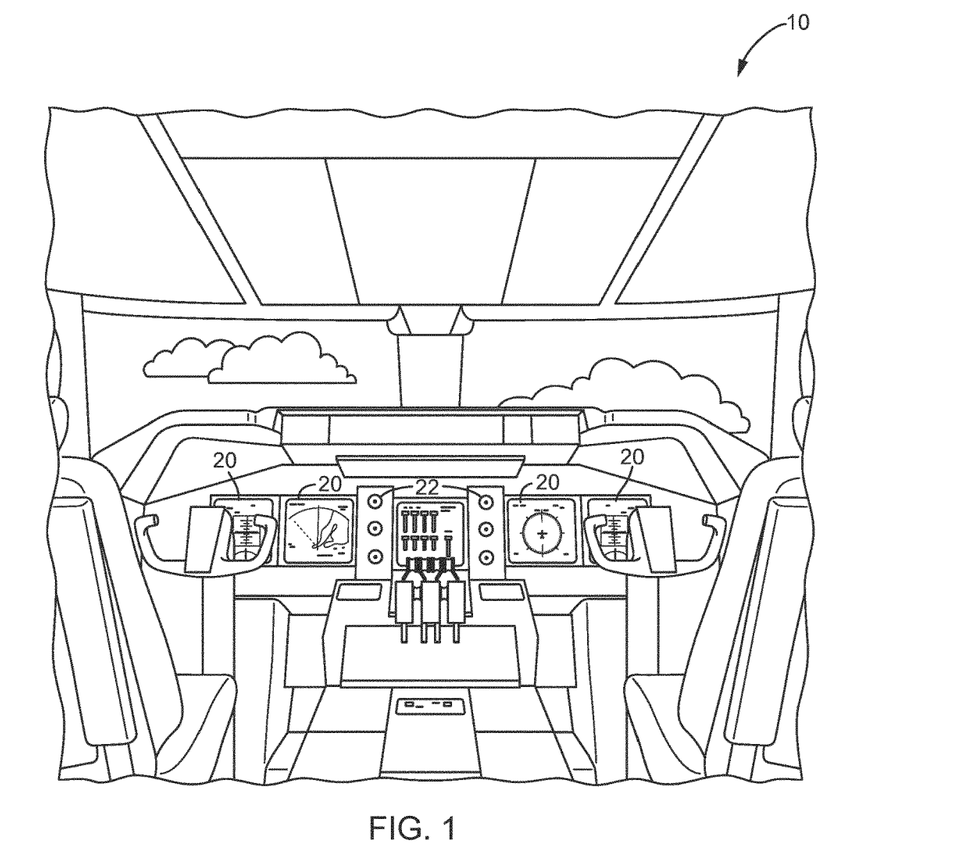
FIG. 1 is a schematic illustration of an aircraft control center, according to an exemplary embodiment.

Referring to FIG. 1, a schematic illustration of an aircraft control center 10 is shown according to an exemplary embodiment of the inventive concepts disclosed herein. The aircraft control center 10 may include one or more flight displays 20 and one or more user interface (UI) elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass® and so on. The flight displays 20 may be used to provide information to the flight crew, thereby increasing the flight crew's visual range and enhancing their decision-making abilities. The flight displays 20 may be configured to function as, for example, a primary flight display (PFD) used to display altitude, airspeed, vertical speed, navigation and traffic collision avoidance system (TCAS) advisories, and/or a crew alert system (CAS) configured to provide alerts to the flight crew. The flight displays 20 may also be configured to function as, for example, a multi-function display used to display navigation maps, weather radar, electronic charts, TCAS traffic, aircraft maintenance data and electronic checklists, manuals, and procedures. The flight displays 20 may also be configured to function as, for example, an engine indicating and crew-alerting system (EICAS) display used to display critical engine and system status data. Other types and functions of the flight displays 20 are contemplated and will be apparent to those skilled in the art. According to various exemplary embodiments of the inventive concepts disclosed herein, at least one of the flight displays 20 may be configured to provide a rendered display from the systems and methods described herein.

In some embodiments, the flight displays 20 may provide an output from an aircraft-based system, a ground-based system, a satellite-based system, or from a system of another aircraft. For example, in one embodiment, the flight displays 20 provide an output from a ground-based weather radar system. In some embodiments, the flight displays 20 provide an output from an aircraft-based weather radar system, LIDAR system, infrared system or other system on the aircraft. For example, the flight displays 20 may include an avionics display, a joint display, an air traffic display, a weather radar map, and a terrain display. The flight displays 20 may include an electronic display or a synthetic vision system (SVS). For example, the flight displays 20 may include a display configured to display a two-dimensional (2-D) image, a three-dimensional (3-D) perspective image of air traffic data, terrain, and/or weather information, or a four-dimensional (4-D) display of weather information or forecast information. Other views of air traffic information, terrain, and/or weather information may also be provided (e.g., plan view, horizontal view, and vertical view). The views shown on the flight displays 20 may include monochrome or color graphical representations of the displayed information. Graphical representations of the displayed information may include an indication of altitude of other aircraft, weather conditions, or terrain, or the altitude and/or location of such information relative to the aircraft.

The UI elements 22 may include, for example, dials, switches, buttons, touch screens, keyboards, a mouse, joysticks, cursor control devices (CCDs) or other multi-function key pads certified for use with avionics systems. The UI elements 22 may be configured to, for example, allow an aircraft crew member to interact with various avionics applications and perform functions such as data entry, manipulation of navigational maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew member to adjust the brightness, contrast, and information displayed on the flight displays 20. The UI elements 22 may additionally be used to acknowledge or dismiss an indicator provided by the flight displays 20. Further, the UI elements 22 may be used to correct errors on the flight displays 20. Other UI elements 22, such as indicator lights, displays, display elements, and audio alerting devices, may be configured to warn of potentially threatening conditions such as severe weather, terrain, and obstacles.

Figure 2:
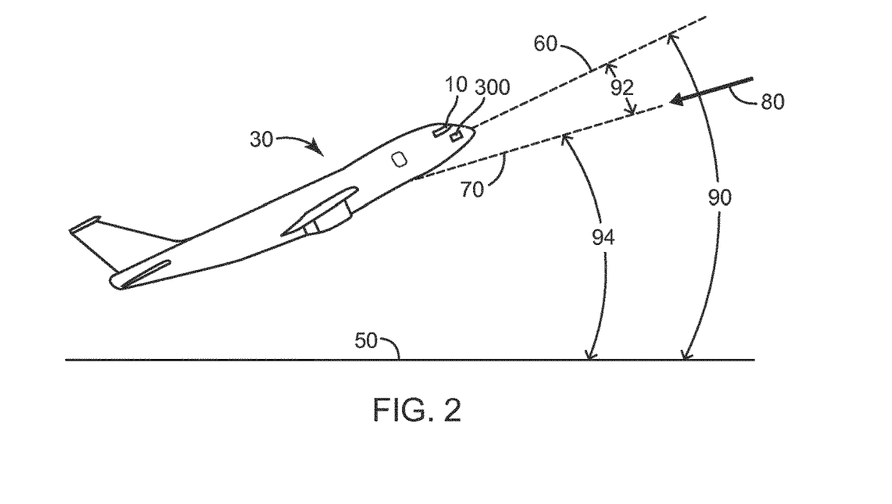
FIG. 2 is a side-view schematic illustration of an aircraft with the aircraft control center and an aircraft monitoring system, according to an exemplary embodiment.

Referring now to FIG. 2, a side-view schematic illustration of an aircraft 30 with the aircraft control center 10 and an aircraft monitoring system 300 is shown according to an exemplary embodiment of the inventive concepts disclosed herein. As shown in FIG. 2, the aircraft 30 is an airplane. In alternate embodiments, the aircraft 30 is another type of aviation vehicle (e.g., a jet, a spacecraft, a helicopter). The aircraft monitoring system 300 is configured to acquire aircraft operating data regarding the operation and external characteristics of the aircraft 30. In one embodiment, the aircraft monitoring system 300 includes an air sensor system. The air sensor system may include one or more sensors configured to acquire air data indicative of at least one air characteristic of an environment surrounding the aircraft 30. The at least one air characteristic may include a pressure, an indicated airspeed, a true airspeed, an angle of attack, a pitch angle, an altitude, a temperature, and/or the like. The one or more sensors of the air sensor system may be variously positioned about the aircraft 30 (e.g., on the tail, fuselage, nose, wing). The one or more sensors of the air sensor system may include at least one of a barometer, a pitot tube, a pitot-static tube, an angle of attack probe, and a temperature sensor, among other possible sensors.

In some embodiments, the aircraft monitoring system 300 includes a flight monitoring system. The flight monitoring system may be or include at least one of a global positioning system (GPS), a global navigation satellite system (GNSS), an altitude heading and reference system (AHRS), an inertial reference system (IRS), and a flight management system (FMS). The flight monitoring system may be configured to acquire flight data indicative of at least one flight characteristic of the aircraft 30. The at least one flight characteristic may include at least one of a ground speed, a vertical speed, a pitch angle, and an altitude of the aircraft 30.

According to an exemplary embodiment, the air sensor system and the flight monitoring system of the aircraft monitoring system 300 are configured to acquire aircraft operating data regarding a flight path of the aircraft 30. In one embodiment, the aircraft monitoring system 300 is configured to acquire data indicative of a pitch angle 90, an angle of attack 92, and a flight path angle 94 of the aircraft 30. The angle of attack 92 is the angle between oncoming air or relative wind 80 and a reference line 60 on the airplane or wing. The reference line 60 is typically a line connecting the leading edge and trailing edge at some average point on the wing or fuselage. The pitch angle 90 is the angle between the reference line 60 (i.e., where the aircraft 30 is pointed) and the horizon 50. The flight path angle 94 is the angle between the flight path vector 70 (i.e., where the aircraft 30 is going) and the local atmosphere or the horizon 50. The flight path angle 94 is also known as the climb (or descent) angle.

By way of example, a pitot-static tube is configured to measure an indicated airspeed of the aircraft 30. The indicated airspeed may be displayed on an airspeed indicator within the aircraft control center 10, which may then be suitably corrected by an operator (e.g., pilot, co-pilot) of the aircraft (e.g., based on pressure, temperature, altitude) to determine a true airspeed. However, external conditions may arise where the hardware of the pitot-static tube is still operating properly, but the pitot-static tube is not measuring accurate data due to the environmental effects (e.g., ports of the pitot-static tube are covered in ice). Such a situation may cause the pitot-static tube to measure an inaccurate indicated airspeed, which can lead to pilot error. Thus, the air data measured by the air sensor system may be monitored to determine whether a sensor of the air sensor is potentially experiencing a failed state. Specifically, the air data measured by the air sensor system may be used to determine a first flight path angle 94 and the flight data measured by the flight monitoring system may be used to determine a second flight path angle 94. The two flight path angles 94 may then be compared to determine whether a sensor of the air sensor system is inaccurately measuring the air data (e.g., experiencing a failed state), as described more fully herein.

Figure 3:
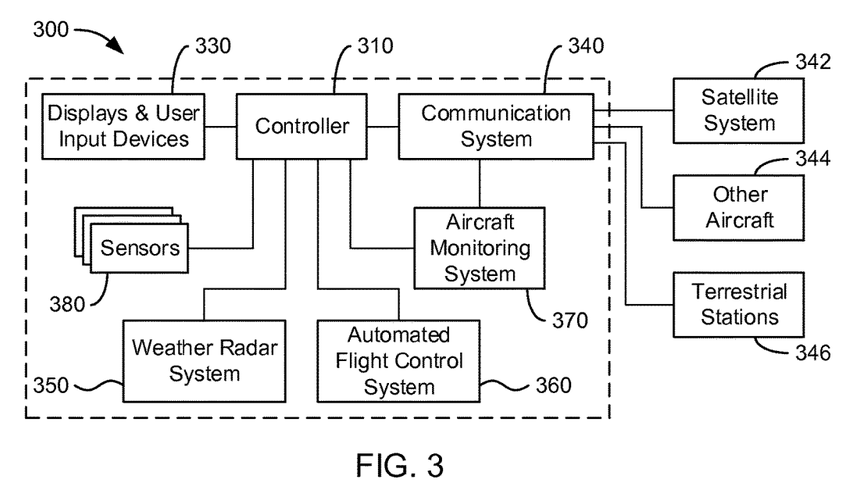
FIG. 3 is a block diagram of the aircraft monitoring system including a controller, according to an exemplary embodiment.

Referring now to FIG. 3, a block diagram of the aircraft monitoring system 300 including a controller 310 is shown according to an exemplary embodiment of the inventive concepts disclosed herein. The aircraft monitoring system 300 further includes a communications interface, displays and user input/output (I/O) devices 330, a communication system 340, a weather radar system 350, an automated flight control system 360, a flight monitoring system 370, and a sensor system 380.

The controller 310 may include a communications interface configured to send data to, receive data from, or otherwise facilitate electronic data communications with aircraft-based systems, satellite-based systems, or ground-based systems. The controller 310 may interface with or be a flight management system, aircraft control system, aircraft monitoring system, or the like. In one example, the controller 310 may communicate with the displays and user I/O devices 330, the communication system 340, the weather radar system 350, the automated flight control system 360, the flight monitoring system 370, and/or the sensor system 380. The controller 310 may include the communication system 340, the automated flight control system 360, and/or the sensor system 380, among other possibilities.

The displays and user I/O devices 330 may be installed or located in an aircraft control center 10. For example, the displays and user I/O devices 330 may include a single device for providing (e.g., visually, aurally) information and receiving an input (e.g., a touchpad) or may include separate devices for providing information and receiving an input (e.g., an LCD screen and a keyboard), and may be or include electronic displays and input devices of any nature, such as the flight displays 20 and the UI elements 22. The displays and user I/O devices 330 are configured to display air data (e.g., measured air data, estimated air data) and provide an alert when a failed state of a sensor of the sensor system 380 is detected or estimated air data is not valid.

In some embodiments, the communication system 340 facilitates communications between the controller 310 and a satellite system 342, other aircraft 344, a terrestrial stations 346, or other air, space, or ground-based systems. For example, the communication system 340 may send data to and receive data from external ground-based weather supplier systems and ground-based air traffic control systems. The communication system 340 may be configured to communicate with systems external to the aircraft using any number of systems or methods. In some embodiments, the communication system 340 sends and receives data over a mobile network. The communication system 340 may utilize various types of channels to communicate, including virtual channels, radio channels, satellite channels, and so on. The channels may be bi-directional or uni-directional and may be satellite link channels, VHF channels, INMARSAT channels, and so on. The communication system 340 may include wired or wireless interfaces (e.g., jacks, antennas, transmitters, receivers, transceivers, wire terminals) for conducting data communications with various systems, devices, or networks. For example, the communication system 340 may include an Ethernet card and port for sending and receiving data via an Ethernet-based communications network and/or a WiFi transceiver for communicating via a wireless communications network. In some embodiments, the communication system 340 may be configured to communicate via local area networks or wide area networks and may use a variety of communications protocols. In some embodiments, the communication system 340 includes components of ground-based systems or components of aircraft-based systems. Any type of wireless communications may be utilized. Various types of communication protocols, including network and ad hoc network protocols may be used to perform communication operations and establish channels to facilitate communications. In some embodiments, aircraft-based systems may communicate with ground-based systems through short-range wireless communication systems 340 or wired interfaces (e.g., when the aircraft is parked at a terminal or otherwise grounded).

In some embodiments, the communication system 340 may be configured to transmit, upload, or otherwise output data to an external system, such as the terrestrial stations 346. In some embodiments, the communication system 340 continuously maintains a data transfer connection with an external system. In some embodiments, the communication system 340 initiates a data transfer connection with an external system only when in range, or only during or after a certain event, such as a user instructing the communication system 340 to initiate a data transfer, the aircraft landing at an airport, the aircraft coming to a stop, the aircraft docking at an airport terminal, or the aircraft pulling into an aircraft hangar.

The weather radar system 350 may be a system for detecting weather patterns, such as wind patterns. According to an exemplary embodiment, the weather radar system 350 is configured to acquire wind data indicative of at least one wind characteristic near the aircraft 30. The at least one wind characteristic may include a wind speed, a wind direction, forecasted winds, a magnetic heading, a cross-track, and the like. The wind data may be transmitted from the weather radar system 350 to the controller 310 for further processing and analysis. Detected weather patterns may be communicated to the displays and user I/O devices 330 (e.g., via the controller 310) for display to the flight crew. In another embodiment, the satellite system 342, the terrestrial stations 346, and/or other aircrafts 344 transmit wind data to controller 310 via the communication system 340. In another embodiment, the controller 310 is configured to estimate the wind data using wind models for a particular location, altitude, and time of a flight and/or based on previously measured wind data.

The aircraft monitoring system 300 may include or interact with an automated flight control system 360. The automated flight control system 360 may be configured to perform navigation functions such as determining a flight plan, causing an aircraft to follow the flight plan using the aircraft's autopilot mode, adjusting flight plans based on various factors, and/or engaging/disengaging the autopilot mode based on instructions received from the controller 310 and/or the flight crew.

The flight monitoring system 370 may be or include at least one of a GPS, a GNSS, an AHRS, an IRS, and a FMS. The flight monitoring system 370 may be configured to acquire flight data indicative of at least one flight characteristic of the aircraft 30. The at least one flight characteristic may include at least one of a ground speed, a vertical speed, a pitch angle, and an altitude of the aircraft 30. According to an exemplary embodiment, the flight monitoring system 370 is communicably coupled with the communication system 340 such that the flight monitoring system 370 is able to receive at least a portion of the flight data from the satellite system 342. The flight monitoring system 370 may be configured to transmit the flight data to the controller 310 for further processing and analysis.

In some embodiments, the sensor system 380 may include, one or more fuel sensors, airspeed sensors, location tracking sensors (e.g., GPS), lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, or any other aircraft sensors or sensing systems that may be used to monitor the performance of an aircraft or weather local to or remote from the aircraft. According to an exemplary embodiment, the sensor system 380 includes or is configured as an air sensor system. The air sensor system may include one or more sensors configured to acquire air data indicative of at least one air characteristic of an environment surrounding the aircraft 30. The at least one air characteristic may include a pressure, an indicated airspeed, a true airspeed, an angle of attack, a pitch angle, an altitude, a temperature, and/or the like. The sensor system 380 may be located in various positions on an aircraft, and a single sensor may be configured to acquire more than one type of sensor data. Data from the sensor system 380 may be output to the controller 310 for further processing and display, or for transmission to a terrestrial station (e.g., a ground-based weather radar system, air traffic control services system, or other terrestrial station) or to the other aircrafts 344 via the communication system 340.

Figure 4:
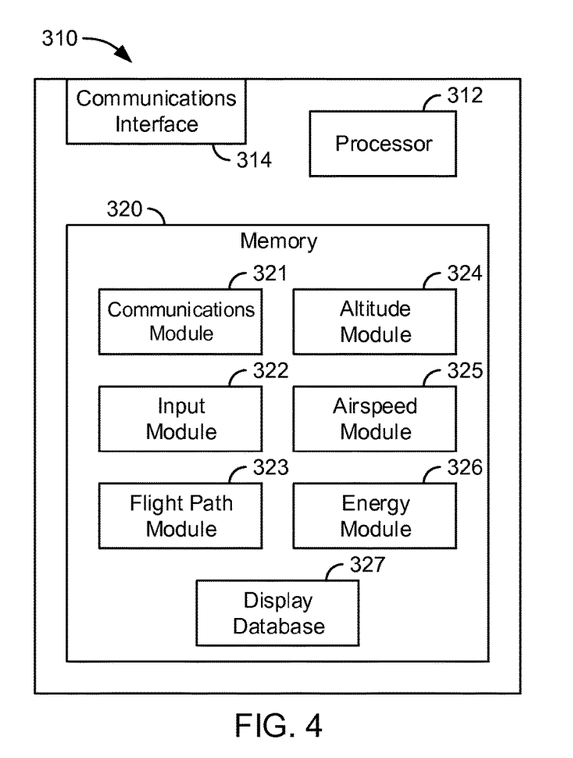
FIG. 4 is a block diagram of the controller of the aircraft monitoring system, according to an exemplary embodiment.

Referring now to FIG. 4, a block diagram of the controller 310 of the aircraft monitoring system 300 is shown according to an exemplary embodiment of the inventive concepts disclosed herein. The controller 310 includes a processor 312, a communications interface 314, and a memory 320. The communications interface 314 is configured to facilitate communications with other components of the aircraft monitoring system 300. The processor 312 may be coupled with the memory 320, which may comprise a non-transitory processor-readable medium storing processor-executable code and/or data. The processor 312 may be implemented as a specific purpose processor, an application specific integrated circuit (ASIC), one or more field programmable gate arrays (FPGAs), a group of processing components, or other suitable electronic processing components. Any controllers and modules described herein may be implemented as a hardware circuit comprising custom VLSI circuits or gate arrays, semiconductors such as logic chips, transistors, or other discrete components, and may be implemented in programmable hardware devices such as field programmable gate arrays, programmable array logic, programmable logic devices or the like.

The memory 320 is one or more devices for storing data and/or computer code for completing and/or facilitating the various user or client processes, layers, and modules described in the present disclosure. The memory 320 may be or include volatile memory or non-volatile memory and may include database components, object code components, script components, or any other type of information structure for supporting the various activities and information structures of the exemplary embodiments of the inventive concepts disclosed herein. The memory may be a non-transitory machine-readable media for carrying or having machine-executable instructions or data structures stored thereon. By way of example, such machine-readable media may include random access memory (RAM), read only memory (ROM), erasable programmable read only memory (EPROM), electrically erasable programmable memory (EEPROM), CD-ROM, flash memory, or other optical disk storage, magnetic disk storage or other magnetic storage devices, or any other medium which may be used to carry or store desired program code in the form of machine-executable instructions or data structures and which may be accessed by a special purpose computer or other machine with a processor. Combinations of the above are also included within the scope of machine-readable storage media. Machine-executable instructions include, for example, instructions and data which cause a special purpose computer or special purpose processing machine to perform a certain function or group of functions. Machine or computer-readable storage media, as referenced herein, do not include transitory media (i.e., signals in space). The memory 320 is communicably connected to the processor 312 and includes computer code or instruction modules for executing one or more processes described herein.

The communications interface 314 may facilitate communications with other components of the aircraft monitoring system 300. For example, the communications interface 314 may facilitate communications with the communication system 340, the controller 310, and the displays and user I/O devices 330. The communications interface 314 may be configured to receive data from the weather radar system 350, the flight monitoring system 370, and/or the sensor system 380, and to analyze and communicate the data to and from the displays and user I/O devices 330 via a wired or wireless connection. The communications interface 314 may include any type of wired or wireless technology for facilitating communications, including electronic and optical communication protocols.

The memory 320 is shown to include various modules for cross checking the aircraft operating data (e.g., air data, flight data) of the aircraft 30, including a communications module 321, an input module 322, a flight path module 323, an altitude module 324, an airspeed module 325, a validation module 326, and an output module 327. The communications module 321 may be configured to control the communications interface 314 and/or the communication system 340 to control the exchange of data between the various components of the aircraft monitoring system 300. In one embodiment, the communications module 321 is configured to control communication between the controller 310 and the displays and user I/O devices 330, the weather radar system 350, the flight monitoring system 370, the sensor system 380, and/or the various modules of the controller 310. The input module 322 may be configured to receive and/or store aircraft operating data from at least one of the weather radar system 350 (e.g., wind data), the flight monitoring system 370 (e.g., flight data), and the sensor system 380 (e.g., air data). The input module 322 may transmit the various data via the communications module 321 to at least one of the flight path module 323, the altitude module 324, the airspeed module 325, and the validation module 326 to process and/or analyze the data received by the input module 322. In one embodiment, the input module 322 directly provides the aircraft operating data to the output module 327 to display the aircraft operating data to the flight crew. In another embodiment, at least a portion of the aircraft operating data (e.g., measured air data) is replaced with estimated aircraft operating data (e.g., estimated air data), as is described more fully herein. The input module 322 may be configured to receive one or more inputs from the flight crew (e.g., to engage/disengage an autopilot mode of the automated flight control system 360).

The flight path module 323 is configured to receive the measured air data from the air sensor system of the sensor system 380 and the flight data from the flight monitoring system 370 (e.g., via the input module 322, the communications module 321). According to an exemplary embodiment, the flight path module 323 is configured to detect a failed state of the air sensor system (e.g., due to ice forming on the sensors) based on the air data and the flight data. By way of example, detecting the failed state may indicate that at least one sensor of the air sensor system may be inaccurately measuring the air data.

According to an exemplary embodiment, the flight path module 323 is configured to detect a failed state by comparing a first flight path angle (i.e., air data derived flight path angle) to a second flight path angle (i.e., an independent data source calculated flight path angle). The flight path module 323 determines the first flight path angle based on the measured air data including the angle of attack 92 of the aircraft 30 measured by an angle of attack probe of the sensor system 380 and the pitch angle 90 determined by an AHRS, an IRS, and/or a GNSS of the flight monitoring system 370. The flight path module 323 is configured to determine the second flight path angle based on the flight data acquired by the flight monitoring system 370 (i.e., independent of the air sensor system of the sensor system 380) including a vertical speed and a ground speed of the aircraft 30.

According to an exemplary embodiment, the flight path module 323 is further configured to determine a flight path angle difference between the first flight path angle and the second flight path angle. The flight path module 323 then compares the flight path angle difference to a threshold value. In one embodiment, the threshold value is predefined and stored within the memory 320 of the controller 310 based on a characteristic of the aircraft 30 (e.g., a type, make, model, of the aircraft 30). In another embodiment, the threshold value is dynamically adjusted based on various operating conditions of the aircraft 30 and the external environment.

Referring still to FIG. 4, the flight path module 323 is further configured to detect that a flight path angle deviation is present in response to the flight path angle difference being greater than the threshold value. According to an exemplary embodiment, the flight path angle difference being greater than the threshold value indicates that the measured air data is potentially inaccurate (e.g., the air sensor system is measuring inaccurate air data due to external conditions such as ice formation on a sensor). According to an exemplary embodiment, the output module 327 is configured to provide an indication to the flight crew via the displays and user I/O devices 330 that the flight path angle difference is detected. The indication may include an alert or flag on the PFD of the flight displays 20 and/or a visual message/aural alert from the CAS.

The altitude module 324 and the airspeed module 325 are configured to jointly estimate airspeed data to replace the measured airspeed data (e.g., the data that may be inaccurate as indicated in [0039]) in response to the flight path module 323 detecting the failed state of the sensor system 380 and the failed state being indicated to the flight crew. The altitude module 324 is configured to receive the flight data (e.g., from the input module 322, from the flight monitoring system 370) to estimate the altitude of the aircraft 30. In some embodiments, the altitude module 324 receives altitude and barometer information from the flight data. The altitude and barometer information may be from a GNSS system of the flight monitoring system 370 or based on a previous known altitude and/or pressure prior to the failure state. In some embodiments, the estimated altitude may be adjusted based on a correction factor based on the pressure of the external environment surrounding the aircraft. According to an exemplary embodiment, the altitude module 324 is configured to estimate the altitude of the aircraft 30 based on barometer corrected altitude data derived from the flight data.

The airspeed module 325 is configured to acquire wind data to estimate a true airspeed of the aircraft 30. In one embodiment, the airspeed module receives the wind data from the input module 322, another weather information source such as a radar system, and/or the communication system 340 (e.g., via datalink, or from the satellite system 342, the terrestrial stations 346, other aircrafts 344). In another embodiment, the airspeed module 325 determines the wind data using at least one of a wind model and previous know wind data. For example, a wind model may be available for a given altitude, time frame, location, direction of travel at which the aircraft 30 is currently flying. Using the wind model, the airspeed module 325 may determine the wind data. In one non-limiting exemplary embodiment, the estimated true airspeed of the aircraft 30 may be derived from a wind triangle model. In some embodiments, the estimated true air speed may be based on at least one of the wind speed, the wind direction, the cross track wing, and the magnetic heading of the aircraft.

The airspeed module 325 is further configured to determine an estimated indicated airspeed of the aircraft 30 based on the estimated altitude and the estimated true airspeed of the aircraft 30 and/or the air density ratio of air surrounding the aircraft 30. The air density ratio may be determined by the airspeed module 325 using a model, algorithm, function, look-up table, and/or the like based on the estimated altitude.

The output module 327 is further configured to provide the estimated air data (e.g., the estimated altitude, the estimated true airspeed, the estimated indicated airspeed) to at least one of the displays and user I/O devices 330 and the automated flight control system 360. According to an exemplary embodiment, the estimated air data replaces the measured air data on the displays and user I/O devices 330. In some embodiments, the controller 310 is configured to provide an indication that the display device is displaying the estimated air data, not the measured air data. For example, an indication that the estimated air data is being displayed may include the estimated air data being displayed in a different color than the measured air data, placing a box around the estimated airspeed, including an alert message, pop-up, asterisk or other symbol, providing a tone or sound in the aircraft control center 10, and/or by other indications to inform the flight crew that the estimated air data is being presented. In some embodiments, the estimated air data may replace the measured air data. In some embodiments, the estimated air data may be presented side-by-side with the measured air data to, for example, allow the aircraft crew to view both the measured air data and estimated air data. In some embodiments, the automated flight control system 360 may control the aircraft 30 based on the estimated air data when in an autopilot mode.

The validation module 326 may be configured to validate the estimated air data. According to an exemplary embodiment, the validation module 326 uses an energy-based approach to validate the estimated air data. The energy-based approach includes determining an aerodynamic energy of the aircraft 30 based on the estimated true airspeed and the estimated altitude of the aircraft 30. In some embodiments, the aerodynamic energy of the aircraft 30 may be determined further based on the gravitational force on the aircraft 30. The energy-based approach may further include determining an inertial energy of the aircraft 30 based on a speed of the aircraft 30 and altitude of the aircraft 30 received from the flight monitoring system 370.

The validation module 326 is further configured to determine an operating energy range based on the inertial energy of the aircraft 30. In some embodiments, the operating energy range of the aircraft 30 may include a margin of error. In some embodiments, the margin of error may be based on a predetermined margin of error, a characteristic of the aircraft 30, a time of day, and/or a characteristic of the environment surrounding the aircraft 30 (e.g., current or forecasted weather conditions). In some embodiments, the margin of error factor is a dynamic value determined by the validation module 326 that may take into account a characteristic of the aircraft 30 in addition to the operating data (e.g., the air data, the wind data, the flight data).

The validation module 326 is further configured to determine whether the aerodynamic energy of the aircraft 30 is within the operating energy range. According to an exemplary embodiment, the validation module 326 validates the estimated air data in response to the aerodynamic energy being within the operating energy range. In one embodiment, the controller 310 allows the automated flight control system 360 to engage an autopilot mode and control the aircraft 370 based on the estimated air data in response to the estimated air data being validated. Conversely, the validation module 326 determines that the estimated air data is not valid in response to the aerodynamic energy being outside of the operating energy range. In one embodiment, the controller 310 prevents the automated flight control system 360 from engaging the autopilot mode in response to the estimated air data being not valid. In some embodiments, the output module 327 is configured to provide an indication that the estimated air data is invalid. The indication that the estimated air data is not valid may include at least one of an alert (e.g., on the PFD/CAS, and audible alert over a speaker system), removing the estimated air data from the displays and user I/O devices 330, and disengaging an autopilot mode of the automated flight control system 360 (e.g., if engaged prior to the invalidation of the estimated air data).

Figure 5:
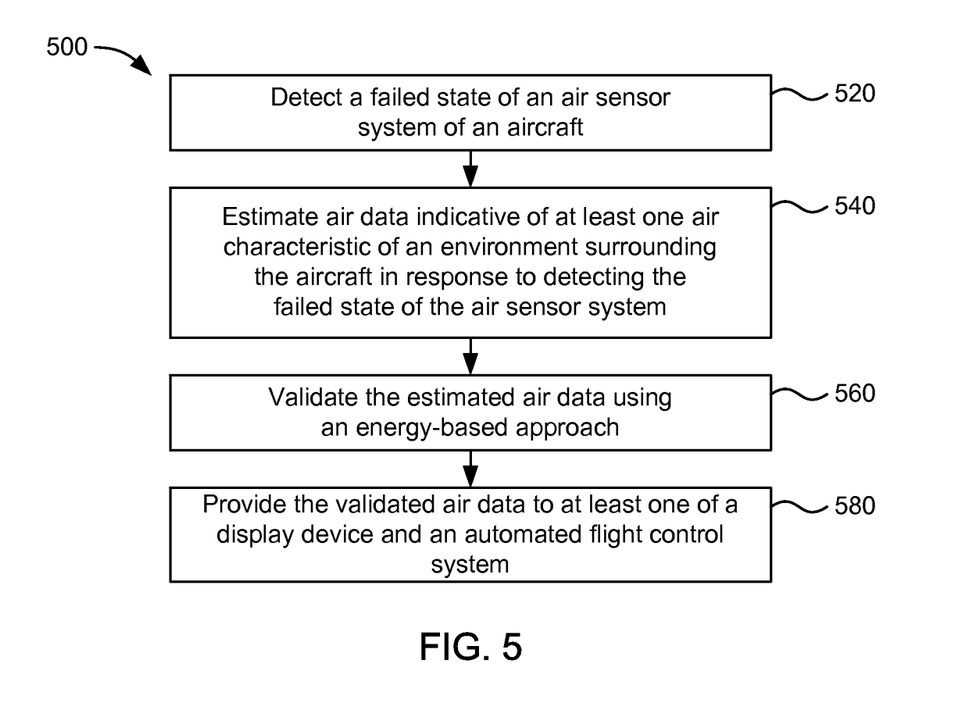
FIG. 5 is a flow diagram of a method for cross checking aircraft operating data, according to an exemplary embodiment.

Referring now to FIG. 5, a flow diagram of a method 500 for cross checking aircraft operating data is shown according to an exemplary embodiment of the inventive concepts disclosed herein. The method 500 may be implemented using any of the systems/apparatuses disclosed herein, such as on the aircraft 30 and/or using the aircraft monitoring system 300. More detailed illustrations and descriptions of portions of method 500 are shown and described with respect to FIGS. 6-8.

At 520, the controller 310 is configured to detect a failed state of the air sensor system of the sensor system 380 of the aircraft 30. At 540, the controller 310 is configured to estimate air data indicative of at least one air characteristic of an environment surrounding the aircraft in response to detecting the failed state of the air sensor system. At 560, the controller 310 is configured to validate the estimated air data using an energy-based approach. At 580, the controller 310 is configured to provide the validated air data to at least one of a display device (e.g., the displays and user I/O devices 330, the flight displays 20, the PFD) and an automated flight control system (e.g., the automated flight control system 360).

Figure 6:
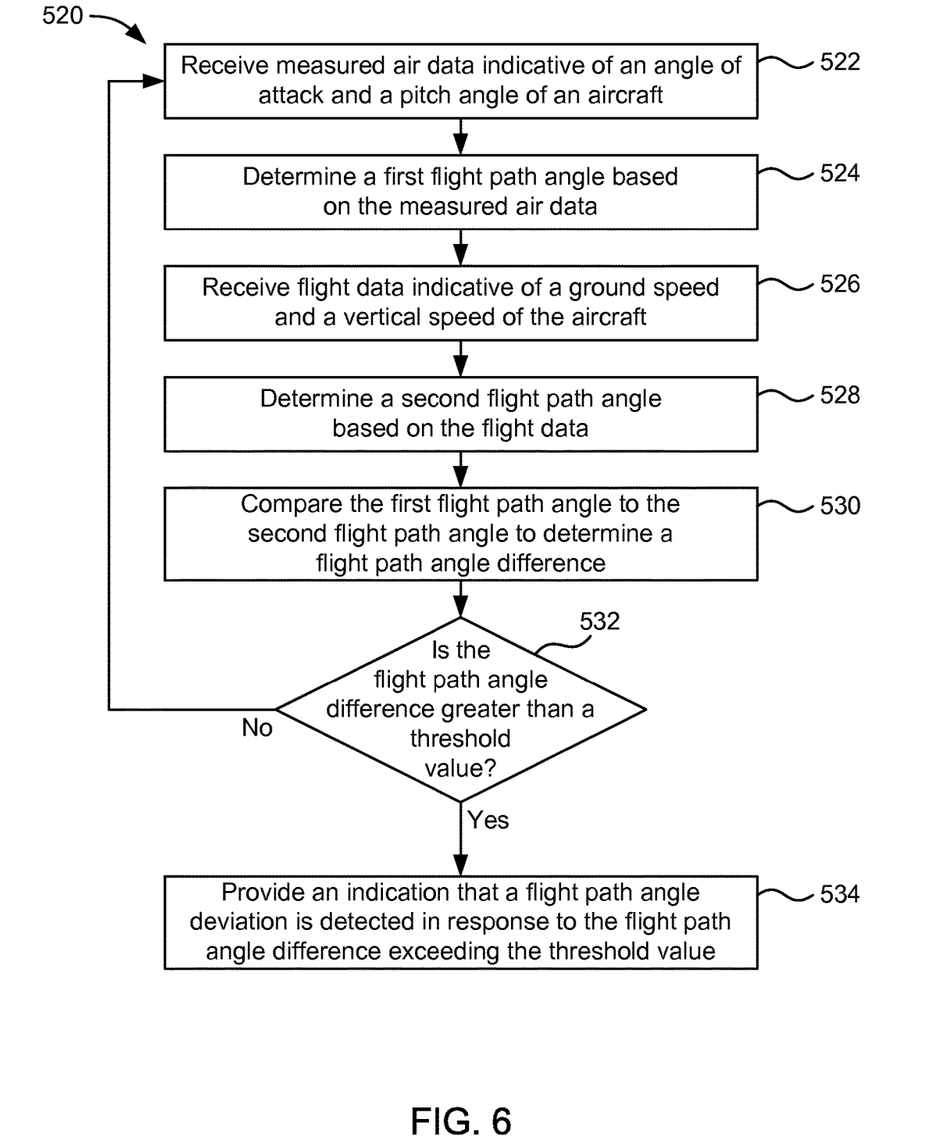
FIG. 6 is a flow diagram of a method for detecting a failed state of an air sensor system of an aircraft for the method of FIG. 5, according to an exemplary embodiment.

Referring now to FIG. 6, a flow diagram of a method 520 for detecting a failed state of the air sensor system of the sensor system 380 of the aircraft 30 for the method 500 of FIG. 5 is shown according to an exemplary embodiment of the inventive concepts disclosed herein. The method 520 may be implemented using any of the systems/apparatuses disclosed herein, such as on the aircraft 30 and/or using the aircraft monitoring system 300.

At 522, the controller 310 is configured to receive measured air data from the air sensor system indicative of an angle of attack (e.g., the angle of attack 92) and a pitch angle (e.g., the pitch angle 90) of the aircraft 30. At 524, the controller 310 is configured to determine a first flight path angle based on the measured air data. At 526, the controller 310 is configured to receive flight data from a source independent of the air sensor system (e.g., the flight monitoring system 370) indicative of a ground speed and a vertical speed of the aircraft. At 528, the controller 310 is configured to determine a second flight path angle based on the flight data. At 530, the controller 310 is configured to compare the first flight path angle to the second flight path angle to determine a flight path angle difference. At 532, the controller 310 is configured to determine whether the flight path angle difference is greater than a threshold value. The controller 310 is configured to repeat 522 to 532 responsive to the flight path angle difference being less that the threshold value. According to an exemplary embodiment, the controller 310 uses the measured air data for flight operation and control as long as the flight path angle difference is less than the threshold value. At 534, the controller 310 is configured to provide an indication that a flight path angle deviation is detected in response to the flight path angle difference exceeding the threshold value. For example, the indication that the flight path angle deviation is detected may include at least one of an alert or flag on the PFD of the flight displays 20 and/or a visual message/aural alert from the CAS. According to an exemplary embodiment, the controller 310 is configured to estimate the air data to replace the measured air data in response to the flight path angle difference exceeding the threshold value.

Figure 7:
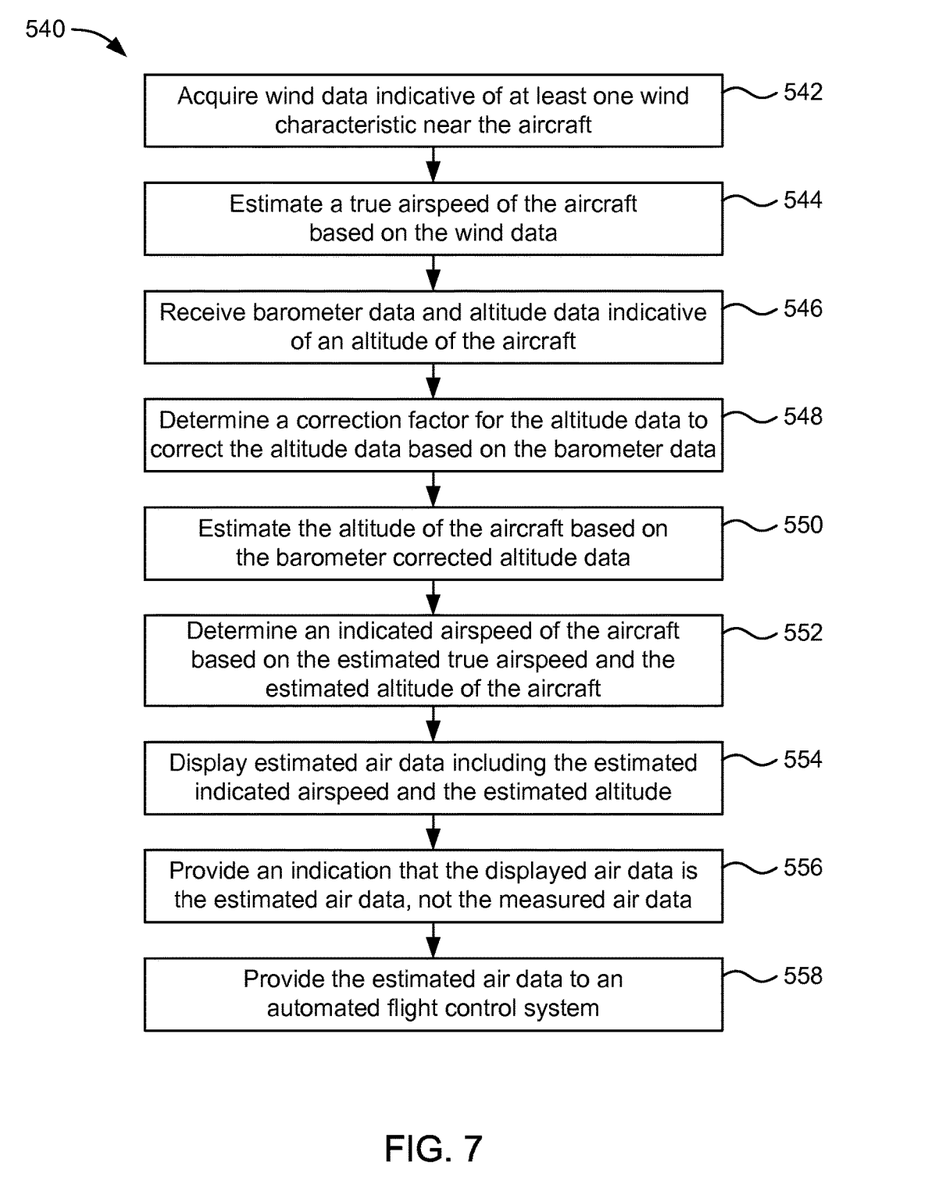
FIG. 7 is a flow diagram of a method for estimating air data for the method of FIG. 5, according to an exemplary embodiment.

Referring now to FIG. 7, a flow diagram of a method 540 for estimating air data for the method 500 of FIG. 5 is shown according to an exemplary embodiment of the inventive concepts disclosed herein. The method 540 may be implemented using any of the systems/apparatuses disclosed herein, such as on the aircraft 30 and/or using the aircraft monitoring system 300.

At 542, the controller 310 is configured to acquire wind data indicative of at least one wind characteristic near the aircraft. In one embodiment, the controller 310 receives the wind data from an external system (e.g., the weather radar system 350, the satellite system 342, the other aircrafts 344, the terrestrial stations 346). In an alternative embodiment, the controller determines the wind data based on a wind model and/or previous known wind data. At 544, the controller 310 is configured to estimate a true airspeed of the aircraft based on the wind data. At 546, the controller 310 is configured to receive barometer data and altitude data indicative of an altitude of the aircraft. At 548, the controller 310 is configured to determine a correction factor for the altitude data to correct the altitude based on the barometer data. At 550, the controller 310 is configured to estimate the altitude of the aircraft based on the barometer corrected altitude data.

At 552, the controller 310 is configured to determine an estimated indicated airspeed of the aircraft based on the estimated true airspeed and the estimated altitude. According to an exemplary embodiment, the controller 310 uses the estimated altitude to determine an air density ratio. The air density ratio may be used to determine the estimated indicated airspeed of the aircraft. At 554, the controller 310 is configured to display the estimated air data via the display device. The estimated air data may include the estimated altitude, the estimated indicated airspeed, and/or the estimated true airspeed of the aircraft. At 556, the controller 310 is configured to provide an indication that the displayed air data is the estimated air data (e.g., not the measured air data, the estimated air data replaces the measured air data). For example, the indication that the estimated air data is being displayed may include the estimated air data being displayed in a different color than the measured air data, placing a box around the estimated airspeed, including an alert message, pop-up, asterisk or other symbol, providing a tone or sound in the aircraft control center 10, and/or by other indications to inform the flight crew that the estimated air data is being presented. At 558, the controller 310 is configured to provide the estimated air data to the automated flight control system. According to an exemplary embodiment, the automated flight control system uses the estimated air data to control the aircraft when an autopilot mode is engaged.

Figure 8:
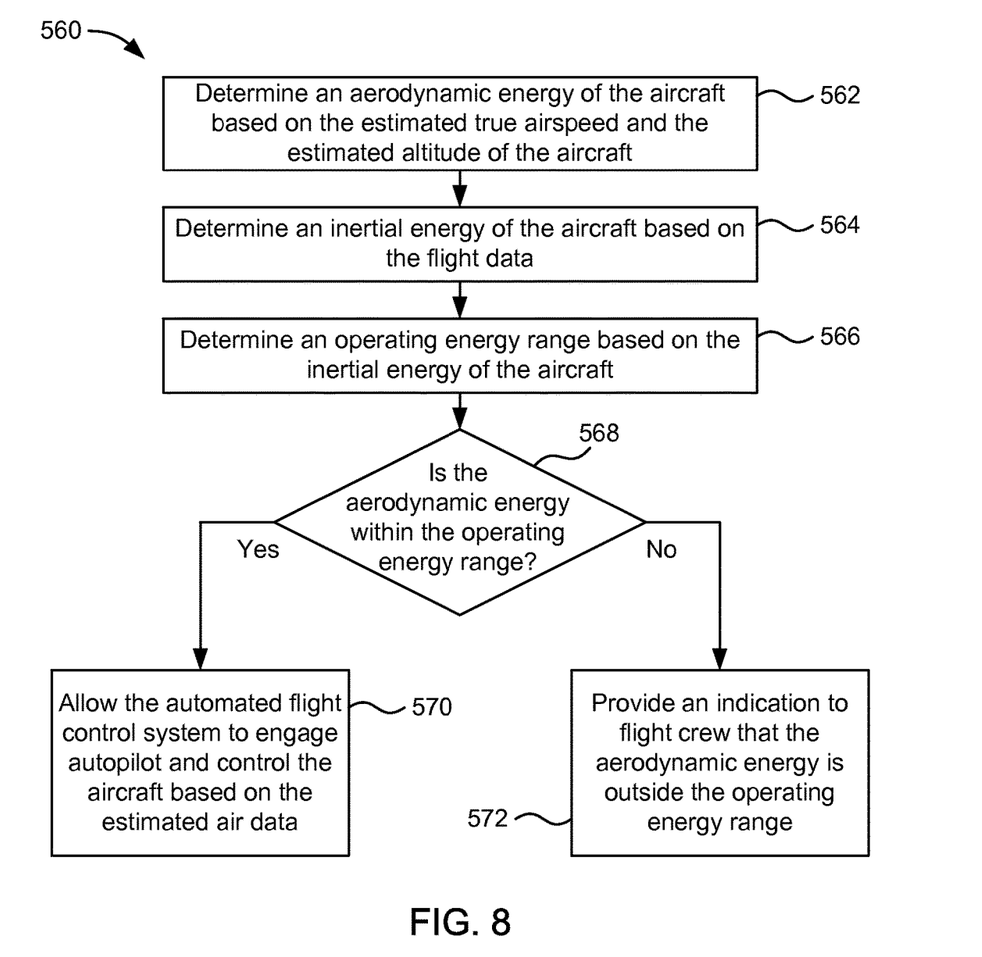
FIG. 8 is a flow diagram of a method for validating estimated air data for the method of FIG. 5, according to an exemplary embodiment.

Referring now to FIG. 8, a flow diagram of a method 560 for validating estimated air data for the method 500 of FIG. 5 is shown according to an exemplary embodiment of the inventive concepts disclosed herein. The method 560 may be implemented using any of the systems/apparatuses disclosed herein, such as on the aircraft 30 and/or using the aircraft monitoring system 300.

At 562, the controller 310 is configured to determine an aerodynamic energy of the aircraft based on the estimated true airspeed and the estimated altitude of the aircraft. At 564, the controller 310 is configured to determine an inertial energy of the aircraft based on the flight data (e.g., aircraft speed, aircraft altitude) received from the flight monitoring system 370. At 566, the controller 310 is configured to determine an operating energy range for the aircraft. The operating energy range defines an upper bound and a lower bound determined from the inertial energy of the aircraft and a margin factor (e.g., to account for potential errors in the computation of the estimated air data).

At 568, the controller 310 is configured to determine whether the aerodynamic energy of the aircraft is within the operating energy range. At 570, the controller 310 is configured to cause the automated flight control system to engage/activate the autopilot mode of operation and control the aircraft based on the estimated air data in response to the estimated air data been validated (i.e., the aerodynamic energy being within the operating energy range). In some embodiments, the flight crew may choose to operate the aircraft in a free mode, engage the autopilot mode, or disengage the autopilot mode while the estimated air data is valid. At 572, the controller 310 is configured to provide an indication to the flight crew that the aerodynamic energy is outside the operating energy range, which may indicate that the estimated air data is not valid (e.g., the aerodynamic energy is outside the operating energy range). The indication that the estimated air data is not valid may include at least one of an alert (e.g., on the PFD/CAS, and audible alert over a speaker system), removing the estimated air data from the display device, and disengaging the autopilot mode of the automated flight control system (e.g., if engaged prior to the invalidation of the estimated air data). In some embodiments, the controller 310 is configured to prevent the autopilot mode from being engaged/activated while the estimated air data is invalid.

The inventive concepts disclosed herein are described above with reference to drawings. These drawings illustrate certain details of specific embodiments that implement the systems and methods and programs of the inventive concepts disclosed herein. However, describing the inventive concepts disclosed herein with drawings should not be construed as imposing on the inventive concepts disclosed herein any limitations that may be present in the drawings. The inventive concepts disclosed herein contemplate methods, systems and program products on machine-readable media capable of accomplishing its operations. The embodiments of the inventive concepts disclosed herein may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step of the inventive concepts disclosed herein are intended to be dedicated to the public, regardless of whether the element, component or method step is explicitly recited in the claims.

Some embodiments of the disclosure are described in the general context of method steps which may be implemented in one embodiment by a program product including machine-executable instructions, such as program code, for example, in the form of program modules executed by machines in networked environments. The program modules may include routines, programs, objects, components, data structures, and so on, that perform particular tasks or implement particular data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments may use computer networks, intranets, and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It should be noted that although the flowcharts and diagrams provided herein may show a specific order of method steps, it is understood that the order of these steps may differ from what is depicted. Also two or more steps may be performed concurrently or with partial concurrence. Such variation may depend on the software and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A system for cross checking aircraft operating data, comprising:
    a communications system configured to:
    receive measured air data indicative of an air characteristic of an aircraft from an air sensor system, the air characteristic including an angle of attack and a pitch angle of the aircraft; and
    receive flight data indicative of a flight characteristic of the aircraft from a flight monitoring system, the flight characteristic including a ground speed and a vertical speed of the aircraft; and
    at least one processor coupled with the communications system and with a non-transitory processor-readable medium storing processor-executable code for causing the at least one processor to:
    determine a first flight path angle of a current flight path of the aircraft based on the angle of attack and the pitch angle derived from the measured air data;
    determine a second flight path angle of the current flight path of the aircraft based on the vertical speed and the ground speed derived from the flight data; and
    detect a failed state of the air sensor system in response to the first flight path angle differing from the second flight path angle by a value greater than a threshold value, the failed state indicating that the air sensor system is inaccurately measuring the air data;
    estimate air data in response to detecting the failed state of the air sensor system, the estimated air data including an estimated indicated airspeed of the aircraft; and
    control system control flight operations of the aircraft based on the estimated air data.

2. The system of claim 1, wherein the non-transitory processor-readable medium further stores processor-executable code for causing the at least one processor to provide an indication that the failed state is detected based on the first flight path angle differing from the second flight path angle by a value greater than the threshold value.

3. The system of claim 1, wherein the non-transitory processor-readable medium further stores processor-executable code for causing the at least one processor to provide the estimated air data to a display device and provide an indication that the display device is displaying the estimated air data rather than the measured air data.

4. The system of claim 1, wherein the non-transitory processor-readable medium further stores processor-executable code for causing the at least one processor to validate the estimated air data.

5. The system of claim 4, wherein the non-transitory processor-readable medium further stores processor-executable code for causing the at least one processor to validate the estimated air data by:
    determining an aerodynamic energy of the aircraft based on the estimated air data;
    determining an inertial energy of the aircraft based on the flight data; and
    validating that the aerodynamic energy is within an operating energy range, wherein the operating energy range is based on the inertial energy of the aircraft.

6. The system of claim 4, wherein the non-transitory processor-readable medium further stores processor-executable code for causing the at least one processor to at least one of (i) cause an automated flight control system to engage an autopilot mode and control the aircraft based on the estimated air data in response to the estimated air data being validated, and (ii) prevent the automated flight control system from engaging the autopilot mode in response to the estimated air data not being validated.

7. The system of claim 4, wherein the non-transitory processor-readable medium further stores processor-executable code for causing the at least one processor to provide an indication that the estimated air data is not valid, wherein the indication that the estimated air data is not valid includes at least one of an alert, ceasing the display of the estimated air data on a display device, and disengaging an autopilot mode of an automated flight control system.

8. The system of claim 1, wherein the air characteristic further includes at least one of a pressure, an indicated airspeed, a true airspeed, an altitude, and a temperature, and wherein the flight characteristic further includes at least one of a pitch angle and an altitude.

9. The system of claim 1, wherein the flight monitoring system includes at least one of a global navigation satellite system, an altitude and reference heading system, an inertial reference system, and a flight management system.

10. A method for cross checking aircraft operating data, comprising:

receiving measured air data from an air sensor system indicative of at least one air characteristic of an aircraft by at least one processor executing processor-readable code stored in a non-transitory processor-readable medium;

receiving, by the at least one processor, flight data from a flight monitoring system indicative of at least one flight characteristic of the aircraft;

determining, by the at least one processor, a first flight path angle of a current flight path of the aircraft based on the measured air data, wherein the measured air data is indicative of an angle of attack and a pitch angle of the aircraft;

determining, by the at least one processor, a second flight path angle of the current flight path of the aircraft based on the flight data, wherein the flight data is indicative of a ground speed and a vertical speed of the aircraft;

comparing, by the at least one processor, the first flight path angle to the second flight path angle to determine a flight path angle difference; and detecting, by the at least one processor, a failed state of the air sensor system in response to the flight path angle difference being greater than a threshold value;

estimating, by the at least one processor, air data indicative of at least one of an estimated indicated airspeed and an estimated altitude of the aircraft;

providing, by the at least one processor, the estimated air data to at least one of a display device and an automated flight control system of the aircraft to replace the measured air data; and controlling, by the automated flight control system, flight operations of the aircraft based on the estimated air data when an autopilot mode is engaged.

11. The method of claim 10, further comprising providing, by the at least one processor via the display device, an indication that a flight path angle deviation is detected in response to the flight path angle difference exceeding the threshold value.

12. The method of claim 10, wherein estimating the altitude of the aircraft includes:

receiving, by the at least one processor, barometer data and altitude data indicative of the altitude of the aircraft;

determining, by the at least one processor, a correction factor for the altitude data based on the barometer data; and estimating, by the at least one processor, the altitude of the aircraft based on the barometer corrected altitude data.

13. The method of claim 12, wherein estimating the indicated airspeed of the aircraft includes:

receiving, by the at least one processor, wind data indicative of at least one wind characteristic near the aircraft;

estimating, by the at least one processor, a true airspeed of the aircraft based on the wind data;

determining, by the at least one processor, the indicated airspeed of the aircraft based on the estimated true airspeed and the estimated altitude of the aircraft.

14. The method of claim 13, further comprising validating, by the at least one processor, the estimated air data.

15. The method of claim 14, wherein the estimated air data is validated based on an energy determination, and wherein the energy determination includes:

determining, by the at least one processor, an aerodynamic energy of the aircraft based on the estimated true airspeed and the estimated altitude of the aircraft;

determining, by the at least one processor, an inertial energy of the aircraft based on the flight data and the altitude data;

determining, by the at least one processor, an operating energy range of the aircraft based on the inertial energy of the aircraft; and determining, by the at least one processor, that the estimated air data is valid based on the aerodynamic energy being within the operating energy range.

16. The method of claim 15, further comprising at least one of:

causing, by the at least one processor, the automated flight control system to engage the autopilot mode and control the aircraft based on the estimated air data being valid; and providing, by the at least one processor, an indication that the estimated air data is inaccurate in response to the aerodynamic energy being outside of the operating energy range.

17. The system of claim 1, wherein hardware of the air sensor system maintains functionality, yet inaccurately measures the air data when in the failed state.

18. The system of claim 1, wherein the non-transitory processor-readable medium estimates the indicated airspeed of the aircraft by further storing processor-executable code for causing the at least one processor to:

receive barometer data and altitude data indicative of an altitude of the aircraft;

determine a correction factor for the altitude data based on the barometer data; and estimate the altitude of the aircraft based on the barometer corrected altitude data.

19. The system of claim 18, wherein the non-transitory processor-readable medium estimates the indicated airspeed of the aircraft by further storing processor-executable code for causing the at least one processor to:

receive wind data indicative of at least one wind characteristic near the aircraft;

estimate a true airspeed of the aircraft based on the wind data; and determine the indicated airspeed of the aircraft based on the estimated true airspeed and the estimated altitude of the aircraft.

* * * * *